United States Patent Office 2,858,507
Patented Oct. 28, 1958

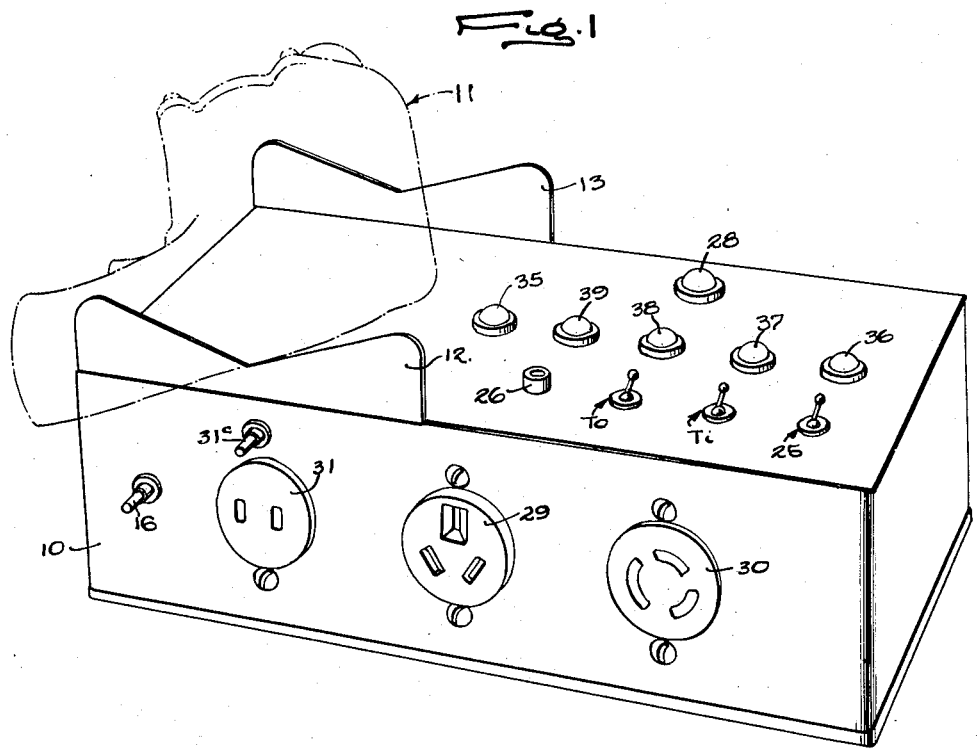
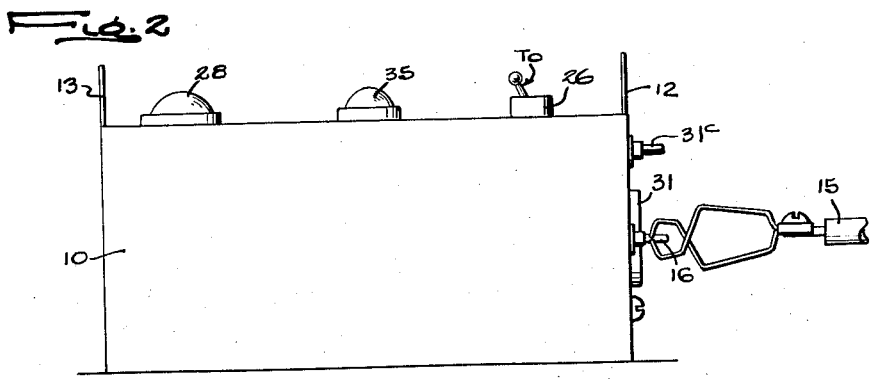

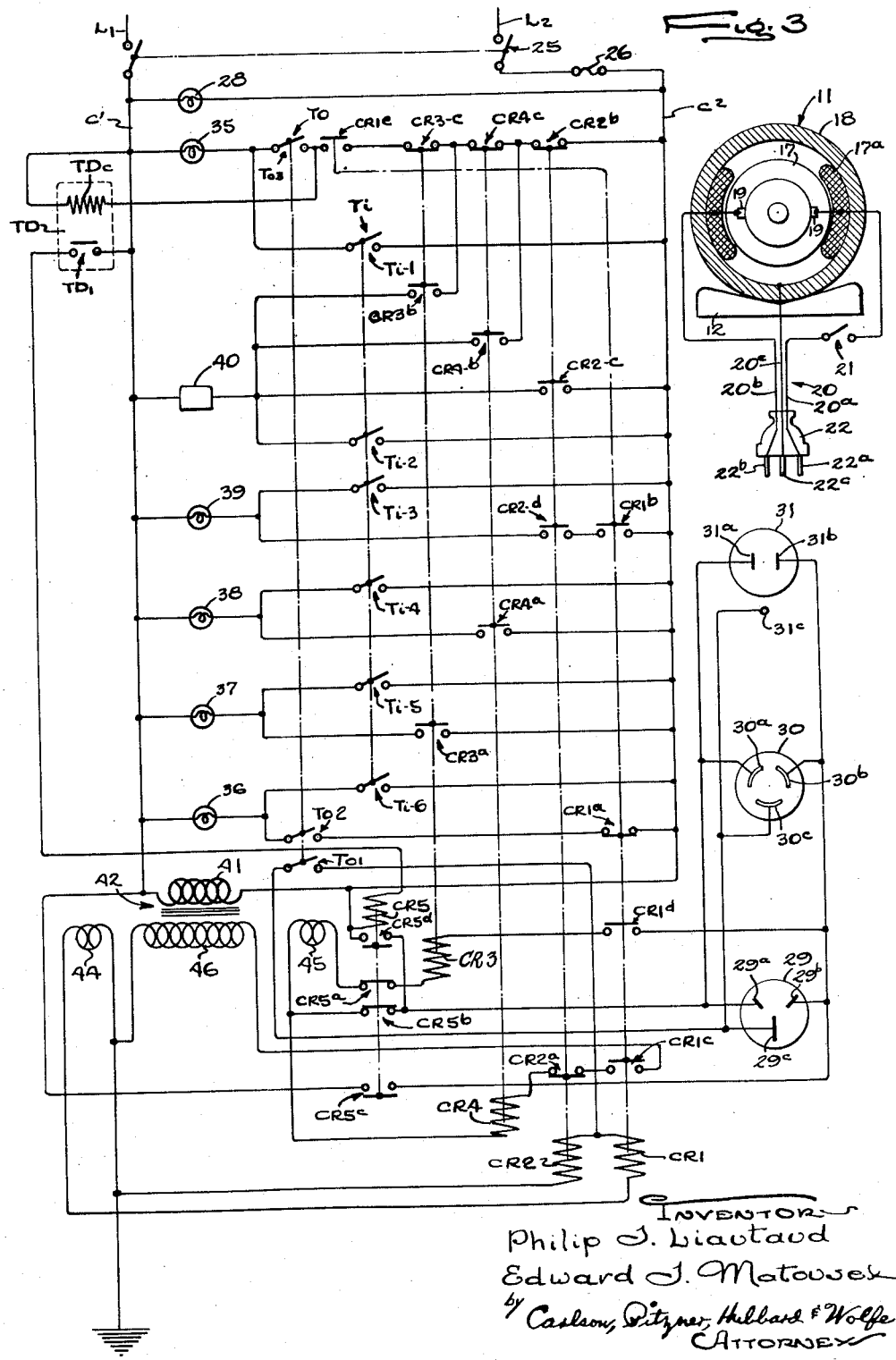

2,858,507

ELECTRIC TESTING DEVICE

Philip J. Liautaud, Chicago, and Edward J. Matousek, La Grange Park, Ill., assignors to Fendall Company, Chicago, Ill., a corporation of Illinois Application December 10, 1953, Serial No. 397,411

7 Claims. (Cl. 324—73)

The present invention relates to electric testing devices for determining and indicating the electrical condition of electrical equipment. More particularly, the invention relates to testing devices for performing a plurality of independent tests on electrical equipment to determine whether or not the equipment is in safe, operable condition.

The general aim of the invention is to provide a compact, unitary testing device of the foregoing type in which a plurality of tests are automatically carried out, some simultaneously and some sequentially, completely checking an item of electrical equipment for various possible faults and indicating which, if any, fault is present.

It is another object of the invention to provide such a tester which may be operated by an unskilled workman, such as a tool crib clerk, with complete safety.

A further object of the invention is the provision of a multiple-test device which performs certain tests at relatively low, harmless voltages and subsequent tests at relatively high voltages in order to thoroughly check the electrical equipment. In addition, the invention provides means for locking out or preventing the occurrence of the high voltage tests in the event one of the preceding low voltage tests shows a fault.

Still another object of the invention is the provision of a novel circuit for performing a test of the conductivity of the grounding connection to the housing of an electrical tool, serving to detect and indicate if the connection is "good" (below a first predetermined small resistance), "open" (above a second predetermined greater resistance), or "faulty" (of a resistance intermediate the first and second predetermined values).

Other objects and advantages will become apparent as the following description proceeds, taken in conjunction with the accompanying drawings, in which:

Figure 1 is a perspective view of an electric testing device embodying the features of the present invention;

Fig. 2 is a side elevation of the device shown in Fig. 1; and

Fig. 3 is a schematic diagram of the several interrelated circuits employed in the device.

While the invention has been shown and is described in some detail with reference to a particular preferred embodiment thereof, there is no intention that it thus be limited to such detail. On the contrary, the intention here is to cover all alterations, modifications, and equivalents falling within the spirit and scope of the invention as defined by the appended claims.

The use of portable electric tools and equipment in industry has increased rapidly in recent years. A wide variety of such tools, for example, rotary devices for drilling, grinding, buffing, and the like, soldering irons or other heating devices, and many others, are employed in industrial plants in great numbers. With rough handling by a number of different workmen, it is possible for such hand tools in general, or any other items of electrical equipment, to develop any one of a variety of electrical faults which might either be dangerous to the user or at least consuming of his time if he connects and prepares to use a tool which is in fact inoperative or shorted. The need arises, therefore, for a compact electrical testing device which may be operated with safety by unskilled workmen in completely and quickly checking a wide variety of electrical tools and the like, and in determining which, if any, faults are present. With the use of such a tester, a faulty tool may be checked prior to each use, and set aside for proper repair and a different one employed in its place.

It is to the satisfaction of this need that the present invention is directed through the provision of improved, coacting testing circuits for performing a plurality of individual tests upon items of electrical equipment.

Referring now to the drawings, the exemplary form of electric testing device here shown as embodying the invention includes a small, portable casing 10 which is preferably fabricated from sheet metal and which mounts on its top panel a number of switches and visual indicator lamps. The switches, lamps, and a plurality of plug-connector sockets mounted on the front of the panel, are connected with testing circuits located within the casing. As a typical item of electrical equipment to be tested, an electric drill 11 is here shown as resting on a pair of conductive brackets 12 and 13, upstanding from the casing 10 to provide not only a convenient support but also an electrical connection between the housing of the drill 11 and the casing 10. In the event any particular item to be tested cannot be placed in the cradle formed by the brackets 12 and 13, a connection between its housing and casing 10 may be made by a clip-lead 15 or other suitable means. For the reception of such a clip-lead, a stud 16 is mounted on the front panel of the casing 10 (Fig. 2).

In order to make clear the organization of the present test device and its operation, the basic elements found in most all electric tools will be briefly considered. Such tools conventionally include a metallic or conductive housing which contains some form of operating element, for example, a heater or a motor winding. In the case of the drill 11 here shown, a housing 18 encloses an electric motor having an armature 17 and a field winding 17a which may be considered as a single operating element having its opposite ends connected with brushes 19. Additionally, electric tools generally are equipped with a power cord, here shown as a cord 20 including three conductors 20a, 20b, and 20c, two of which are connected with opposite ends of the operating element, in the present instance conductors 20a and 20b, and the third of which is connected to the tool housing 18. Generally, a switch 21 is interposed in one of the first two conductors and actuated by means extending through the housing.

For the convenient connection of the tool to electrical voltage outlets the cord 20 is equipped with a male connector having one prong for each of the conductors. The cooperating female outlet sockets are usually one of three types, a first type having three angularly disposed rectangular receptacles for receiving corresponding connector prongs, two of which serve as voltage source connections and the third of which is grounded; a second type of socket includes three arcuate circularly spaced receptacles for receiving similarly shaped and spaced prongs; while a third type socket includes two side-by-side receptacles for receiving a double-pronged connector, the third conductor of the cord being terminated with a fitting adapting it for connection to any convenient grounding point.

The third conductor 20c of the cord 20 is provided to ground the equipment housing 18 thereby assuring that if the working part of the tool is accidentally engaged with a high voltage line, or if the tool's electrical operating element should become connected with the housing, the operator of the tool does not receive a current shock through his body, but instead is by-passed by the ground connection. It is important, therefore, that the equipment grounding conductor $20c$ and its connection to the housing $18$ be maintained in good condition with a relatively low resistance. A break in the conductor $20c$ or its connection to the housing constitutes a serious fault which should be corrected before the tool is used.

A second fault which may develop in the tool is the shorting of the electrical operating element, for example, by deterioration or damage of the insulation in the armature $17$ or field windings $17a$ of the motor illustrated. If such a faulty short develops, it is very likely that a fuse will be blown or a circuit breaker tripped when the tool is connected with a voltage source and its switch $21$ closed.

A third possible fault is the connection of the electrical element of the tool with its housing so that the latter becomes "hot," creating a short circuit to ground through the grounding conductor. This is known as a "power ground" and is likely to result in the blowing of a fuse if the connection is of low resistance; on the other hand, if the faulty connection is of high resistance a fuse will not be blown but danger to an operator may result.

Finally, it is possible for a defect to arise in the electrical or mechanical operation of the tool even though the foregoing faults are not present. For this reason, it is desirable that the tool be actually run or operated, thus completely checking it prior to connecting it for actual use.

With more particular reference to Fig. 3, the electrical circuits for the present testing device comprise, in this instance, main conductors $C_1$ and $C_2$ adapted to be connected to a suitable voltage source indicated by the lines $L_1$ and $L_2$ through an on-off switch $25$. This connection may be made by a plug connector (not shown) and means are also provided for connecting the casing $10$ to ground. Preferably a protective fuse $26$ is connected directly in series with the switch $25$, and a pilot lamp $28$ is connected directly between the conductors $C_1$ and $C_2$ to give a visual indication when the conductors are energized and the device is ready for use.

In order that an electrical tool having its power cord terminated in any of the several types of plug connectors may be easily, quickly, and safely connected with the testing circuits, three connector sockets $29$, $30$, and $31$ are mounted in the front panel of the casing $10$. The sockets $29$ and $30$ each has three receptacles designated by the respective subscripts $a$, $b$, and $c$, for receiving the corresponding angularly or circularly spaced prongs $22a$, $22b$, and $22c$ of the plug connector $22$ of the tool, depending upon which type the latter may be. Should the connector $22$ be of the double-prong type with a terminal fitting on the ground conductor $20c$, a stud $31c$ is mounted adjacent the twin receptacle socket $31$ for receiving such fitting. Simply by resting the tool on the brackets $12$ and $13$, and by plugging its connector $22$ into the proper socket $29$, $30$, or $31$, as the case may require, the tool is ready for testing after its own on-off switch $21$, if it has one, is closed.

The testing device as here embodied is intended to perform four independent tests on the tool $11$. These are: (1) a test of the continuity of the ground conductor $20c$ and its connection to the housing $18$ (hereinafter termed the "equipment ground connection"), at the same time providing that, in the event the equipment ground is hanging by one or only a few strands of wire, such strands are burned off by current flow and the open condition indicated; (2) a test for determining whether or not the equipment ground connection is faulty, i. e., of an unduly high resistance; (3) a test for determining partial or complete shorting of the tool operating element (hereinafter termed a "short circuit" condition); (4) a test of the insulation between the operating element and the housing $18$ (hereinafter termed the "power ground test"); and (5) an operational test of the tool under running conditions which serves to reveal any mechanical defects or lack of continuity in the conductors $20a$, $20b$, and the operating element, should the tool fail to operate properly.

The testing circuits, their operation, and their automatic sequencing will be described presently. For indicating the several possible faults revealed by the tests, the following visual and audible signals are provided. First, a "no-fault" or "good tool" lamp $35$ is connected across the conductors $C_1$, $C_2$ through means controlled by the testing circuits which permit it to remain energized from the time the tests are started until a fault is detected. This lamp may be colored green, for example, to indicate, as long as it remains energized during the whole testing process, that the tool is in good electrical condition.

Other lamps $36$, $37$, $38$, and $39$ are similarly connected across the conductors $C_1$ and $C_2$ through means controlled by the test circuits for indicating respectively (1) an open equipment ground connection in the tool; (2) a faulty or "high resistance" equipment ground connection; (3) a short circuit or unduly low resistance in the tool's operating element; or (4) a breakdown in the insulation between the tool's operating element and housing $18$. For convenience, the lamp $36$ may be termed an "open equipment ground" indicator, the lamp $37$ a "short circuit" indicator, the lamp $38$ a "power ground" indicator, and the lamp $39$ a "faulty equipment ground" indicator. These lamps may be colored red, for example, to warn that the tool being tested is unsafe, in the event one becomes lighted during the tests.

In addition to these lamps, an audible signal or buzzer $40$ is connected between the conductors $C_1$ and $C_2$ through means controlled by the test circuits for energizing it only when and if a fault in the tool is detected. Such means are arranged to sound the buzzer $40$ in response to any type of fault, thus directing an operation's attention to the signal lights in order that he may determine which one of the faults is present.

Before testing a tool, the indicators are first checked to make sure that they are in good operating condition by closing a six-pole single-throw "test indicator" switch $T_j$ having contacts $T_{i1-6}$. These contacts temporarily connect the "no-fault" lamp $35$, the buzzer $40$, and the lamps $39$, $38$, $37$, and $36$ directly across the conductors $C_1$ and $C_2$. Should one of the lamps fail to light or the buzzer fail to sound, it may be immediately replaced. This preliminary check of the indicators assures that if a fault is present in the tool being tested, it will not remain unnoticed due to a defect in the corresponding indicator.

For energizing the first three test circuits a primary winding $41$ of a transformer $42$ is connected directly between the conductors $C_1$ and $C_2$, the transformer having three secondary windings $44$, $45$, and $46$.

In accordance with the invention, the first test circuit determines the condition of the equipment ground connection in the tool being tested, and includes the secondary winding $44$, having one side thereof connected to the casing $10$; the coil of a first control relay CR1, contacts $T_{o1}$ of a multi-contact "test operate" switch $T_o$, and the ground terminals $29c$, $30c$ and $31c$ of the respective sockets. Since the tool $11$ under test has its prong $22c$ connected with, say, the receptacle $29c$, the circuit is completed through the equipment ground conductor $20c$ and the housing $18$ if the ground connection for the tool $11$ is not broken. The control relay CR1 is constructed and arranged to require an appreciable current flow in its coil for its operation. Thus, in the event the conductor $20c$ and its connection to the housing $18$ present a relatively low resistance, a relatively high current flows in the circuit described, thereby energizing the relay CR1 to open its normally closed contacts CR1–$a$, and to close its normally open contacts CR1–$b$, CR1–$c$, CR1–$d$, and CR1–$e$.

In order to detect when the tool's equipment ground connection is continuous but of a relatively high resistance rendering it dangerous, a coil of a second control relay CR2 is connected across the series combination of the secondary winding 44 and coil of relay CR1. This places the coil of relay CR2 also in parallel with the equipment ground connection of the tool 11. If such ground connection is of very low resistance, it shunts the coil of relay CR2 so that the latter is not energized. Conversely, if the tool's equipment ground connection presents a high resistance or is open, the coil of relay CR2 is not shunted but is energized, thus opening its corresponding normally closed relay contacts CR2–a and CR2–b, while closing normally open contacts CR2–c and CR2–d.

With the tool connected to the testing device as described above, the testing procedure is initiated by first closing the switch 25, noting that the pilot light 28 is energized and the device ready for use, and then closing the "test-operate" switch $T_o$. The contacts $T_{o2}$ complete the energizing circuit for the "open ground" lamp 36 through the contacs $T_{o2}$ and CR1–a, lighting the lamp unless the latter contacts open. Further, the contacts $T_{o1}$ simultaneously complete the first test circuit so that current flows from the winding 44 through the coils of relays CR1 and CR2 in magnitude according to the condition of the tool's ground connection. Since the equipment ground connection normally and desirably presents a very low resistance, the secondary winding 44 is preferably designed to provide a relatively low voltage, in the order of four volts, but with a relatively high current capacity, in the order of 30 amperes, so that if the equipment ground connection is continuous only through a wire "whisker," the latter will be burned off to create an open condition which will then be indicated.

If the equipment ground connection for the tool is satisfactory, i. e., continuous and below a first predetermined resistance, then a relatively great current flows through coil of relay CR1 to energize it and cause actuation of its corresponding contacts CR1–a through CR1–e. In such case the contacts CR1–e complete an energizing circuit for the "no-fault" lamp 35, which then remains lighted unless and until a fault is detected. At the same time the contacts CR1–a break the circuit for lamp 36 so that the latter does not indicate a fault. The coil of relay CR2 is not energized because it is shunted by the low resistance of the equipment ground connection. On the other hand, if the tool's equipment ground connection is "open," that is, above a second predetermined but higher resistance, only a relatively small circulating current flows from winding 44 through the coils of the two relays CR1 and CR2 sufficient to energize the latter but not the former. Thus, the contacts CR1–a remain closed and the lamp 36 lighted to show an open equipment ground condition. The contacts CR2–c are also closed to energize the buzzer 40, thereby giving an audible warning to the operator; and the contacts CR2–b are opened to de-energize the "no-fault" lamp 35.

In the event the tool's equipment ground is continuous but of an unsatisfactorily high resistance, that is, above the first predetermined resistance, but below the second predetermined resistance, current flows through both the equipment ground connection and the coil of relay CR2, the sum of such currents passing through the coil of relay CR1. This serves to energize the coils of both relays CR1 and CR2. As a result, the circuit for the lamp 36 is broken by the contact CR1–a, but the circuit for the "faulty equipment ground" lamp 39 is completed through the contacts CR2–d and CR1–b, lighting the lamp to indicate a faulty or "high resistance" ground connection. At the same time, the contacts CR2–b break the circuit for the "no-fault" lamp 35 to de-energize it, while the contacts CR2–c complete a circuit for the buzzer 40. The audible signal therefore calls the attention of an operator to the lighted lamp 39.

In review, it will be seen that only the coil of relay CR1 is energized if the equipment ground connection is satisfactory; only the coil of relay CR2 is energized if such connection is "open"; and that the coils of both relays CR1 and CR2 are energized if the ground connection is "faulty," i. e., of high resistance. In the first case, no fault signal results and the lamp 35 is lighted, while in the second case the lamp 36 and buzzer 40 are energized and the lamp 35 de-energized; in the third case the lamp 39 and buzzer 40 are energized and the lamp 35 de-energized.

The second test circuit, in keeping with the invention, includes means for passing a current through the power conductors 20a and 20b and the operating element of the tool and for sensing an unduly low resistance presented by such operating element, due, for example, to shorted conductors therein. In the present instance, the second test circuit comprises, in series relation, the secondary winding 45, normally closed contacts CR5–a of a control relay CR5 to be described more fully below, the coil of a third control relay CR3, normally open contacts CR1–d, the receptacle 29b of the socket 29, the conductor 20b of the tool under test, the tool's operating element, the conductor 20a, the receptacle 29a, and normally closed contacts CR5–b. Assuming that the contacts CR5–a and CR5–b remain closed, this circuit is complete only if the contacts CR1–d are closed in response to the first test circuit detecting either a "good" equipment ground or a "faulty" equipment ground as evidenced by the energization of the coil of relay CR1. Therefore, only under these conditions will the second test circuit come into operation. It will be "locked out" in the event the first test circuit detects an open equipment ground.

The voltage set up by the winding 45 may be relatively low, in order of six volts, and the current capacity for the winding may be relatively low, in the order of two amperes, since the purpose of the circuit is to detect a short circuit condition in the tool's operating element, that is, to determine whether the resistance presented by such element is below a predetermined maximum of, say, one ohm. With such a low voltage, the second test circuit offers no danger of shock to an operator, and little danger of causing high, damaging currents to be passed through a shorted element.

The second circuit is complete just as soon as the coil of relay CR1 is energized, and current of a magnitude inversely proportional to the resistance of the operating element in the tool is then established in the circuit. In the event the current exceeds a predetermined value, the coil of relay CR3 is energized to close the corresponding normally open contacts CR3–a and CR3–b, and to open the normally closed contacts CR3–c. The "short circuit" indicator lamp 37 is energized through the first of these contacts, the buzzer 40 through the second of the contacts, while the third contacts de-energize the "no-fault" lamp 35. However, in the event the impedance of the tool operating element is satisfactory and above the preselected value, nothing happens and the "no-fault" lamp 35 remains lighted.

The insulation between the operating element and the housing of the tool under test normally and desirably presents a very high resistance, although it is sometimes subject to considerable reduction in resistance or breakdown under unusual working conditions, for example, in a very humid atmosphere. A test of the insulation, therefore, must not only determine if the insulation is broken and conductive, but must also detect any "hidden" defects which might appear when the tool becomes hot or damp.

In accordance with another important feature of the invention, means are provided in the third test circuit for testing and indicating the presence of either low resistance or "hidden" faults in the insulation between the tool operating element and the tool housing, commonly called a "power ground." To this end, a voltage several times greater in magnitude than the normal operating voltage for the tool is employed to energize the third test circuit, such high voltage being sufficient to cause current flow even through the hidden faults.

As here shown, the third circuit includes in series relation the secondary winding 46, which has one side connected to the casing 10 and ground; the normally open contacts CR1–C; the normally closed contacts CR2–a; the coil of a fourth control relay CR4; normally closed relay contacts CR5–b; the socket receptacle 29a, the tool's conductor 20a; the tool's operating element 17, 17a and insulation; the tool's housing 18; and the brackets 12 and 13 which are a part of the casing 10. The secondary winding 46 is designed to provide a relatively high voltage, in the order of 500 volts, so that even slight defects in the insulation will be caused to break down and reveal themselves.

If little or no current flow results in the third circuit, the insulation is satisfactory, no fault indication results, and the "no-fault" lamp 35 remains lighted. However, if appreciable current flows, greater than a predetermined value, the coil of relay CR4 is energized and its corresponding contacts CR4–a, CR4–b, and CR4–c are actuated. The normally open contacts CR4–a close to energize the "power ground" lamp 38; the normally open contacts CR4–b close to energize the buzzer 40; and the normally closed contacts CR4–c open to de-energize the "no-fault" lamp 35. The tool's insulation is, therefore, tested under high potential and any fault positively indicated.

However, it will be noted that this high voltage insulation test will not proceed if the first test circuit detects a fault in the equipment ground of the tool. Since, as previously described, only the coil of CR1 is energized when the first circuit finds a satisfactory equipment ground, this must occur before the contacts CR1–c become closed without the opening of the contacts CR2–a. If the coil of relay CR1 is not energized or if the coil of relay CR2 is energized, the third test circuit cannot be completed. Thus, the high voltage provided by secondary winding 46 is not applied to the tool in the event such voltage would be dangerous due to either an open or a faulty equipment ground. Since the second and third circuits do not accomplish tests which would result in danger from one if the other shows a fault, they proceed simultaneously, being initiated when the coil of relay CR1 is energized by the first circuit.

Finally, the invention contemplates a fourth test circuit including means for applying full line voltage to the operating element of the tool only after the preceding three tests have been completed and only if none indicates a faulty condition. The relatively high operating voltage, for example 110 volts, is thus not applied to the tool if any danger or possible damage to the tool could result therefrom. Upon the energization of the tool operating element, the tool should work in a normal manner, and an operator may inspect it to see if it performs correctly as it should under working conditions. Any erratic operation, for example, might be due to some mechanical failure, while a lack of any response at all might be due to an open or broken condition in the conductor 20a and 20b or the operating element 17, 17a.

As shown in the present instance, the fourth testing circuit includes, in series relation, the coil of a fifth control relay CR5 mentioned above, such coil being connected across the conductors $C_1$ and $C_2$ through normally open contacts $TD_1$ of a time delay relay TD. The coil CR5 is therefore energized only if and when the contacts $TD_1$ close.

When the coil CR5 is energized, its corresponding contacts CR5–a and CR5–b open to interrupt the second and third test circuits, while its two additional normally open contacts CR5–c and CR5–d close to connect the lines $C_1$ and $C_2$, respectively, to the socket receptacles 29b and 29a. The full voltage of the lines $L_1$ and $L_2$ is thus supplied to the operating element of the tool under test so that an operator may observe its performance.

As mentioned briefly above, the "operation" test is locked out in the event one of the preceding tests shows a fault. As here illustrated, such safety "lock out" is accomplished by means of the time delay relay TD which has its operating coil $TD_c$ connected in parallel across the "no-fault" lamp 35 and the contacts $T_{o3}$, that is, across the conductors $C_1$ and $C_2$ through the normally open contacts CR1–e and the normally closed contacts CR3–c, CR4–c, and CR2–b. Therefore, the coil $TD_c$ is energized as soon as the switch contacts $T_{o3}$ are closed and the contacts CR1–e are closed (assuming that the ground conductor 20c is not "open" and the relay CR1 is energized), but the contacts $TD_1$ are not closed until a predetermined delay period, for example five seconds, has elapsed. If the coil $TD_c$ is de-energized during this period, the contacts $TD_1$ do not close. Thus, if the tool equipment ground is found to be open or faulty, and the relay CR2 energized as the result, the opening of contacts CR2–b serves to de-energize both the lamp 35 and the coil $TD_c$ so that the contacts $TD_1$ do not later close. Similarly, if the second or third test circuits find faults in the tool, the contacts CR3–c or CR4–c open, and the coil $TD_1$ is likewise de-energized. Since the first three test circuits complete their tests within the delay period of, say five seconds, the contacts CR5–c and CR5–d are automatically closed at the end of this period to operate the tool if no fault is detected.

In brief recapitulation, it may be observed that the testing device of the present invention described above is relatively small and simple in its construction and organization, but is adequate to detect and indicate any of several faults likely to occur in a variety of types of electrical equipment such as electric drills, soldering irons, and the like. Extension cords may also be tested simply by connecting any operative electric element, such as a light bulb known to be in good condition, at one end and plugging the opposite end into the testing device. The testing device is adapted to accommodate any of a wide range of such tools having various types of plug connectors terminating their power cords. Once the electrical tool, or other electrical device is connected with the present testing device, the testing operation is substantially automatic and foolproof as well as safe, serving to indicate to an unskilled operator which, if any, faults are present in the device under test. Such an operator may then simply tag the device for repair at a later time by a skilled workman. The tester employs high voltages where necessary to be certain that possible faults are detected, yet provides safety for the operator because (1) he need not touch the tool after initiating the tests, and (2) the high voltage is not applied to the tool in the event a low voltage test detects a fault.

We claim as our invention:

1. In a tester for various types of electrical equipment which have a housing and a safety ground conductor normally connected thereto, the combination comprising means for providing a low voltage, high current source; a first relay having an energizing coil responsive to current greater than a first predetermined magnitude and two sets of contacts one of which is normally open and one of which is normally closed; a second relay having an energizing coil responsive to current greater than a second predetermined magnitude which is less than said first predetermined magnitude; said second relay having two sets of normally open contacts; means for connecting said first coil in series with said source, housing and conductor; means for connecting said second coil in parallel with the series combination of said source and said first coil; a first indicator lamp and a circuit therefor including said normally closed first relay contacts; a second indicator lamp and a circuit therefor including said normally open first relay contacts and one of said normally open second relay contacts; an electric audible signal device and a circuit therefor including the other of said normally open second relay contacts; whereby a resistance less than a first predetermined magnitude presented by the housing and the conductor results in energization of said first relay, the second relay being effectively shorted out, so that neither of said lamps nor said signal device is energized; a resistance presented by said conductor housing connection greater than a second predetermined magnitude results in the energization of said second but not said first relay, so that said first lamp and said audible signal device are energized to indicate an "open" equipment ground; and a resistance presented by said conductor housing connection intermediate said first and second predetermined magnitudes results in energization of both said relays so that said second lamp and said audible signal device are energized to indicate a faulty equipment ground.

2. In a tester for electrical equipment having a housing, an operating element in and normally insulated from the housing, and a power cord having two conductors connected respectively to opposite ends of the element and a third grounding conductor normally connected to the housing; the combination of a casing for the tester and a plurality of testing circuits in said casing, means for electrically uniting the equipment housing and said casing, means for coupling said conductors with said circuits, said circuits including a first circuit having means for supplying a low voltage on the order of four volts between said housing and the third conductor, means responsive to current flow in said first circuit for indicating both an open and a high resistance condition between the third conductor and the housing, a second normally incomplete circuit having means for supplying a low voltage in the order of six volts between the second and third conductors, means responsive to current flow in said second circuit for indicating an unduly low impedance condition between said second and third conductors, a third normally incomplete circuit having means for supplying a high voltage on the order of 500 volts between one of said two conductors and said housing, means responsive to the current in said third circuit for indicating a power ground between the element and the housing, a fourth normally incomplete circuit having means for supplying operating voltage to said second and third conductors to operate the equipment if it is not mechanically faulty, means including a relay in series with said first circuit and having contacts connected in series in said second and third circuits for completing said second and third circuits only if the equipment ground connection is not faulty or open, and means including relays in series in said first, second, and third circuits and having contacts connected to control the completion of said fourth circuit for completing said fourth circuit only if there is no indication of a fault in the equipment being tested.

3. For use in testing electrical equipment having a conductive housing, an operating element in and normally insulated from said housing, and a power cord having two conductors connected respectively to opposite ends of the element and a third grounding conductor normally connected to the housing; a testing device comprising, in combination, a conductive casing, support means on said casing for receiving said equipment housing and electrically uniting the two; a first, second, and third electrical terminals in said casing adapted to be removably connected with said first, second, and third conductors, respectively; a first normally incomplete circuit having means for applying a relatively low voltage between said third terminal and said casing; means responsive to a current flow less than a first predetermined magnitude in said first circuit for indicating an open connection between the third conductor and said housing; means responsive to current flow less than a second predetermined magnitude but greater than said first predetermined magnitude in said first circuit for indicating a faulty impedance connection between the third conductor and said housing; a second normally incomplete circuit having means for applying a relatively low voltage between said first and second terminals; means responsive to current flow greater than a predetermined magnitude in said second circuit for indicating a short circuit between the second and third conductors; a third normally incomplete circuit having means for supplying a high voltage between at least one of said first and second terminals and said third terminal, means responsive to current flow greater than a predetermined value in said third circuit for indicating faulty insulation between the equipment element and housing, a fourth normally incomplete circuit having means for applying an operating voltage between said first and second terminals to energize the equipment element, a manually operated switch for completing said first circuit, means including a relay having a coil connected in said first circuit and contacts in said second and third circuits for completing the latter circuits only if the first circuit shows no fault in the equipment, a time delay relay having an actuator energized upon pick-up of said relay and having normally open contacts connected in said fourth circuit for completing the latter, and means responsive to current flow in said first, second and third circuits for de-energizing said actuator before it times out in the event that said first, second, or third circuits show a fault in the equipment.

4. In a device of the type described for testing an electric tool which has a ground conductor and a housing, the combination comprising a voltage source, a switch, and the coil of a first relay all connected in series between two terminals which are adapted for electrical connection to the tool's ground conductor and housing; a second relay having a coil connected between said two terminals; said second relay being adapted to pick up in response to lesser current flow through its coil than said first relay; normally closed first contacts controlled by said first relay; normally open second contacts controlled by said first relay; normally closed third contacts controlled by said second relay; a first indicator connected in series circuit with said first contacts; a second indicator connected in series circuit with said second and third contacts.

5. In a tester for electrical equipment having a housing, an electrical element in the housing, and an equipment grounding conductor connected to the housing; the combination of a first circuit connectable with said housing and conductor and having means responsive to the magnitude of current flow therein to indicate a fault in the connection between the conductor and housing, a second normally incomplete circuit connectable with said element and having means responsive to the magnitude of current flow therethrough to indicate an unduly low or shorted impedance presented by said element, a third normally incomplete circuit connectable between said element and said housing and having means responsive to the magnitude of current flow therein to indicate a power ground connection between said element and housing, a fourth normally incomplete circuit connectable between the opposite ends of said element and having means to supply an operating voltage thereto, means including a relay connected in and responsive to conduction by said first circuit and having contacts in series with said second and third circuits for automatically completing said second and third circuits only after said first circuit shows no fault, and means including relays connected in and respectively responsive to conduction in said first, second, and third circuits and respectively having series-connected contacts connected to effect the automatic completion of said fourth circuit only if said first, second and third circuits detect no defects in the equipment under test.

6. For use in testing an item of electrical equipment having a housing, an electrical operating element in and normally insulated from said housing, and a grounding conductor normally connected to said housing; a tester comprising, in combination, a casing adapted to support said housing in electrical contact therewith; a plug connection for connecting said tester to said item of equipment; a switch mounted on said casing; four circuits in said casing; four indicators and means responsive respectively to conduction conditions in said four circuits for energizing said indicators to show a faulty connection between said conductor and housing, an unduly low or shorted impedance presented by said element, a faulty connection between said element and housing, and for supplying an operating voltage to said element; means responsive to closure of said switch for completing said first circuit; means responsive to current flow of predetermined magnitude in said first circuit for automatically completing said second and third circuits; means responsive to closure of said switch for automatically completing said fourth circuit after a predetermined time delay from the closing of the switch; and means responsive to current flow in said first, second and third circuits for disabling said time delay means and preventing the completion of said fourth circuit if any one of the said three circuits shows a defective condition in the equipment.

7. In a device for performing a plurality of tests on electrical equipment having a housing, an operating element in and insulated from the housing, and a cord including first and second conductors connected with the operating element and a third conductor connected with the housing, the combination comprising means including a normally discontinuous first test circuit for applying a relatively low, harmless voltage between the third conductor and the housing, means including a normally discontinuous second test circuit for applying a relatively low, harmless voltage between the first and second conductors, means including a normally discontinuous third test circuit for applying a relatively high, dangerous voltage between one of the first and second conductors and the housing, means including a normally discontinuous fourth test circuit for applying a relatively high, dangerous operating voltage between the first and second conductors, manually controlled switch means for completing said first circuit, means responsive to current flow of predetermined magnitude in said first circuit for automatically completing said second and third circuits, time delay means actuated in response to completion of said first circuit for completing said fourth circuit, and means responsive to current flow greater than predetermined values in said second and third circuits for disabling said time delay means and preventing completion of said fourth circuit, and means influenced by current conduction in said first and second circuits indicative of an electrical defect for preventing completion of said third and fourth circuits.

References Cited in the file of this patent

UNITED STATES PATENTS

| | | |
|---|---|---|
| 1,852,980 | Robinson | Apr. 5, 1932 |
| 1,969,713 | Bullock | Aug. 14, 1934 |
| 2,442,771 | Kirkpatrick | June 8, 1948 |
| 2,515,623 | Williams | July 18, 1950 |
| 2,584,680 | Doncyson | Feb. 5, 1952 |
| 2,762,014 | Anderson | Sept. 4, 1956 |